United States Patent [19]

Kirchberg, Jr. et al.

[11] Patent Number: 5,043,857

[45] Date of Patent: Aug. 27, 1991

[54] REAL-TIME CONTROL OF PWM INVERTERS BY PATTERN DEVELOPMENT FROM STORED CONSTANTS

[75] Inventors: Maurice A. Kirchberg, Jr., Dubuque, Iowa; Alexander Cook, Rockford, Ill.

[73] Assignee: Sundstrand Corporation, Rockford, Ill.

[21] Appl. No.: 507,489

[22] Filed: Apr. 11, 1990

[51] Int. Cl.[5] .................... H02M 1//12; H02M 5/458

[52] U.S. Cl. ........................................ 363/41; 363/37; 363/98; 363/132

[58] Field of Search ........................ 363/35, 37, 41, 42, 363/95, 97, 98, 132; 318/807-811, 801, 802; 364/480, 486

[56] References Cited

U.S. PATENT DOCUMENTS 3,648,150 3/1972 Kernick et al. ........................ 363/41
4,382,275 5/1983 Glennon ........................ 363/41
4,480,299 10/1984 Muto et al. ........................ 363/41
4,527,226 7/1985 Glennon ........................ 363/41
4,595,976 6/1986 Parro, II ........................ 363/98
4,626,979 12/1986 Jaquay ........................ 363/98
4,635,177 1/1987 Shekhawat et al. ........................ 363/41
4,646,221 2/1987 Sekino et al. ........................ 363/41
4,757,432 7/1988 Hancock ........................ 363/17
4,757,434 7/1988 Kawabata et al. ........................ 363/41

*Primary Examiner*—Peter S. Wong
*Attorney, Agent, or Firm*—Whitham & Marhoefer

[57] ABSTRACT

In a real time control of a pulse width modulated inverter, equations are developed relating switching angle, system parameter or parameters and output harmonics. Constants are stored which define a preferred angle for each switching event. Switching angles are calculated in real time by solving the equation in accordance with the value of the system parameter.

4 Claims, 6 Drawing Sheets

INVERTER CONTROLLER
GENERATOR
RECTIFIER
INVERTER
FILTER
LOADS

PHASE CURRENTS
POR VOLTAGE
D.C. LINK
PARAMETER SENSING LOGIC
SWITCHING ANGLE CONSTANT STORE
SWITCHING ANGLE PROCESSOR
TO INVERTER SWITCHES

REAL-TIME CONTROL OF PWM INVERTERS BY PATTERN DEVELOPMENT FROM STORED CONSTANTS

BACKGROUND OF THE INVENTION

1. Field of the Invention

The present invention generally relates to pulse width modulated (PWM) inverters and, more particularly, to an improved real time method and apparatus for generating modulating patterns in response to changing system parameters.

2. Description of the Prior Art

PWM inverters are employed to convert direct current (d.c.) to alternating current (a.c.). In many applications, it is important to carefully regulate the quality of the a.c. generated by the inverter. Accordingly, it is customary to define a point of regulation (POR) downstream of the inverter at which the voltage and current of the a.c. signal generated by the inverter is sampled. The sampled voltage and current would be used to select appropriate PWM switching patterns to minimize distortion at the POR. Based on the voltage and current sensed at the POR, an inverter controller selects or creates in real time an appropriate PWM pattern to ensure the least distortion at the POR. Obviously, as real and reactive power factors of electrical loads coupled to the inverter change, the PWM patterns fed to the inverter change.

A PWM pattern comprises a set of switching transients which, when applied to a d.c. signal via an inverter, produces alternating pulses which, when filtered, approximates a sinusoidal a.c. signal The pulses in a PWM pattern are of varying width.

Prior inventions have addressed schemes for controlling the harmonic content of the inverter output caused by changes in load parameters. Representative of such inventions is U.S. Pat. No. 4,527,226 to Glennon, which discloses an inverter control system for a PWM inverter circuit This circuit comprises an angle set look up table and selection logic for addressing the look up table The angle set defining the inverter output waveform is selected in response to various operating conditions of the inverter. However, considering the number of parameter values and the degree of regulation desired, the number of patterns which must be stored can be prohibitively large.

Additional prior art approaches to pattern generation include the following patents. An earlier patent to Glennon, U.S. Pat. No. 4,382,275, is directed to a PWM inverter having an output signal with reduced harmonic content, wherein a filtered fundamental PWM signal is summed with a controlled signal.

U.S. Pat. No. 4,595,976 to Parro, II discloses an inverter control which is an enhancement of the Glennon inverter control. More specifically, the table look up is implemented as a plurality of memories, one for each phase, each of which is subdivided into a plurality of memory blocks which store a number of bytes Memory address decoding logic addresses a particular memory block in each memory in accordance with a control signal representing the desired waveform to be generated at each phase output. Thus, the Parro, II inverter control accomplishes individual phase regulation of the inverter output.

U.S. Pat. No. 4,635,177 to Shekhawat et al., discloses a further refinement of the basic Glennon inverter control system More specifically, the Shekhawat et al., control permits on-line generation of PWM patterns for a neutral point clamped PWM inverter. A microprocessor and memory are coupled to the generating circuitry for calculating switching points for the inverter switches during operation of the inverter. Timer modules are coupled to the microprocessor for developing switch points so that the switches are operated to reduce the distortion of the inverter output signal.

U.S. Pat. No. 4,480,299 to Muto et al., also discloses a microprocessor controller inverter control. However, the Muto et al., PWM inverter is controlled by the use of the fundamental wave voltage of the inverter output as a feedback quantity. Muto et al. fail to show any apparatus for directly dealing with the physical limitations within the inverter itself.

Other patents related to the art of inverters include U.S. Pat. Nos. 3,648,150 to Kerick et al., and No. 4,626,979 to JaQuay. The Kerick et al., patent discloses an apparatus for comparing a filtered output of a PWM inverter with a reference waveform and generating output voltage signal to control the inverter drive circuit to produce an output waveform substantially duplicating the reference waveform. The JaQuay patent is similar to the Kerick et al. patent in that it is directed to a PWM inverter, including a comparator for comparing an output voltage with the sum of a reference voltage and a maximum allowable ripple voltage.

Also representative of the prior art are U.S. Pat. No. 4,646,221 to Sekino et al., U.S. Pat. No. 4,757,434 to Kawabata et al., U.S. Pat. No. 4,800,478 to Takahashi, and U.S. Pat. No. 4,757,432 to Hancock. The patent to Sekino et al., is directed to a controlling circuit which monitors the output waveform of the inverter and controls the firing of the switch elements in the inverter to restore it to a sinusoidal waveform in the event that it is distorted by nonlinear loads. The patent to Kawabata et al., is directed to a control circuit for a current control minor loop which monitors the instantaneous value of the output current of the power conversion apparatus and adjusts it to the current reference value. The patent to Takahashi is directed to a control for an inverter, wherein an evaluation function on the whole combination of the inverter and the load connected to the a.c. side of the inverter is minimized. The patent to Hancock is directed to a device for time integrating the difference between the electrical output and the reference by varying the switching frequency in the inverters so as to null the time integrated difference in a feedback control loop.

SUMMARY OF THE INVENTION

It is therefore an object of the present invention to provide a pulse width modulated inverter controller which provides real-time switching pattern development.

It is another object of the invention to provide a controller for a pulse width modulated inverter which accounts for a wide range of parameter variation, and if desires continuous parameter variation.

Briefly, this invention contemplates the provision of a pulse width modulated inverter in which the switching angles are calculated in real time as a function of a system parameter or parameters. An equation relating each switching angle system parameter and harmonic content can be determined empirically or by computer modeling to optimize the inverter output in terms of harmonic content for a range of system parameters effecting harmonic content. In the equation the system parameter is the variable and constants particularize the equation for each switching angle. These constants are stored and as the system parameter changes new switching angles can be readily calculated with the stored constants. As a new angle set is required, due to changes in d.c. rail parameters and/or loads, a new angle set can be calculated on the basis of those parameters. This method of real-time angle set determination depends on a simple function evaluation.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
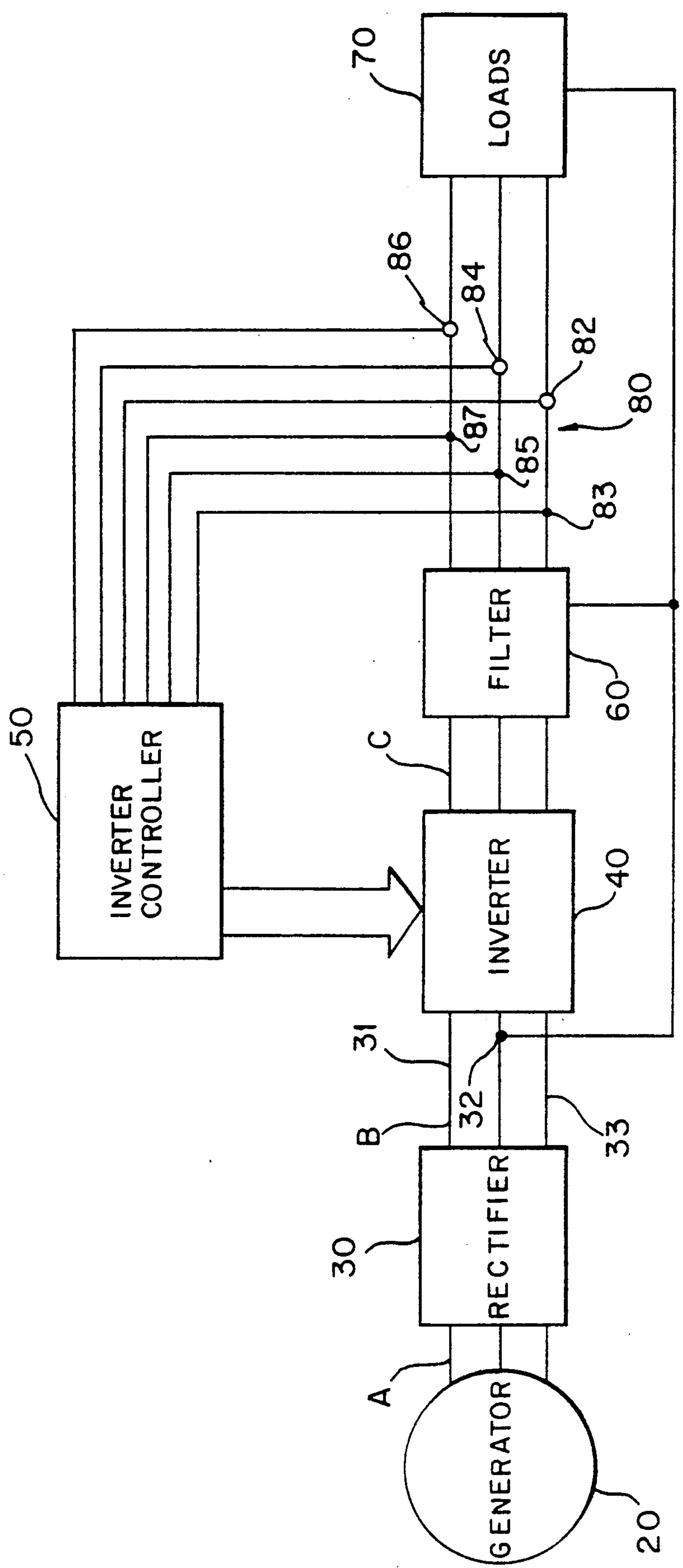
FIG. 1 is a block diagram of a variable speed constant frequency system embodying the invention.

Referring now to the drawings, and more particularly to FIG. 1, there is shown a block diagram of the variable speed constant frequency (VSCF) system embodying the present invention. A generator 20 is mechanically coupled to a variable speed prime mover (not shown) which may be, for example, an aircraft engine. The generator 20 produces power of a frequency which varies as a function of the speed of the prime mover. The resulting a.c. power produced by the generator 20 is therefore termed "wild frequency" a.c. power and is unsuitable for use by aircraft electrical systems or loads, which is the preferred environment for the operation of the VSCF system.

Accordingly, the VSCF system is designed to convert the "wild frequency" a.c. power produced by the generator 20 into constant frequency a.c. power, typically at a frequency in the range of 400 Hz, for use by aircraft electrical systems. "Wild frequency" a.c. power produced by the generator 20 is fed to a rectifier 30 which rectifies the a.c. power into positive and negative d.c. voltages. The d.c. voltages are produced on a d.c. link having a positive d.c. rail 31 and a negative d.c. rail 33. An inverter 40, under control of an inverter controller 50 produces, by pulse width modulation in the preferred embodiment, a PWM waveform from the d.c. voltages which is fed to the filter 60. The filter 60 smooths the PWM waveform produced by the inverter 40 into an approximation of a sinusoidal constant frequency a.c. output which is fed to the aircraft electrical loads 70.

In the preferred embodiment of the invention, the wild a.c. power output by the generator 20 is three-phase a.c. power. The constant frequency a.c. power generated by the inverter 40 and smoothed by the filter 60 is likewise three-phase. In the preferred embodiment of the invention, the inverter is provided with a neutral point via lead 32 coupled to an output phase of the filter 60 and the rectifier 30.

Figure 2:
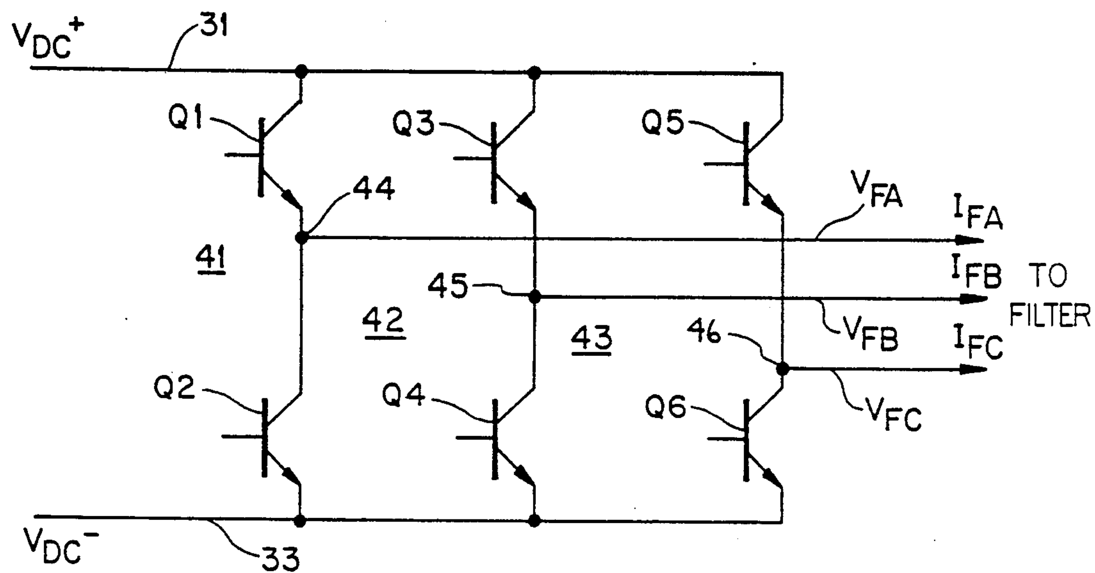
FIG. 2 is a simplified block and schematic diagram of a typical three-phase inverter.

Referring to FIG. 2, the inverter 40 includes three inverter legs 41, 42 and 43, each comprising two controllable power switches, such as switches $Q_1$ and $Q_2$, which are connected in series across the positive and negative d.c. rails 31 and 33. Referring specifically to the inverter leg 41 as an example, the switches $Q_1$ and $Q_2$ are operated in accordance with a PWM waveform pattern developed by the inverter controller 50. Likewise, phase outputs $V_{FB}$, $I_{FB}$ and $V_{FC}$, $I_{FC}$ are produced at the junctions 45 and 46, respectively, by operation of the switches $Q_3$, $Q_4$ and $Q_5$, $Q_6$ in the inverter legs 42 and 43.

Referring back to FIG. 1, the inverter controller 50 responds to signals sensed from a point of regulation (POR), indicated generally as 80, which is located downstream of the filter 60. Current is sensed by current transformers 82, 84 and 86 which sense each of the three phase currents produced by the filter 60, respectively. Likewise, voltages are sensed by taps 83, 85 and 87 applied to each of the three phases produced by the filter 60. Each of the signals appearing at the current transformers 83, 84 and 86, and taps 83, 85 and 87, is fed to the inverter controller 50 and is used to select or generate an appropriate PWM switching pattern. Depending on the real or reactive components of the power requirements of the loads 70, the inverter controller 50 selects from memory or creates in real time a PWM pattern which, when applied to the inverter 40 and filtered by the 60, produces an approximate sinusoidal a.c. output waveform which is optimized to have the least distortion at the POR 80.

The PWM switching pattern produced by the inverter controller 50 is a collection of switching angles, or times, which is used to operate individual transistor switches of the inverter 40. Accordingly, when one knows the current and voltage of the POR 80, one can then determine the nature of the loads 70 (e.g., real and reactive power components and balance of the loads), and can select, or generate, a suitable pattern to control the inverter 40 to minimize distortion at the POR 80. This selection of a basic switching pattern established in part to compensate for load induced errors in the output may use suitable prior art techniques such as those disclosed in the aforementioned Glennon 4,527,226 patent.

Figure 3:
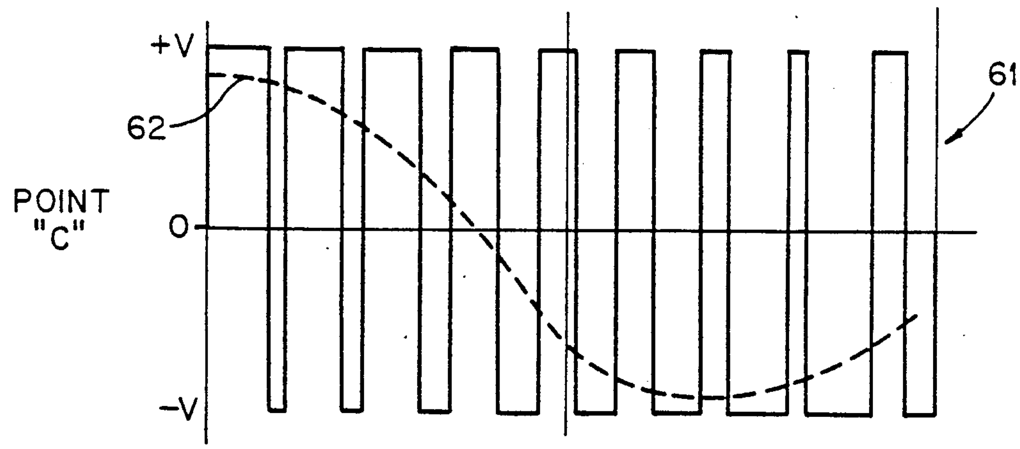
FIG. 3 is a graph representing a controlled inverter output pattern signal taken at point "C" of FIG. 1.
Figure 4:
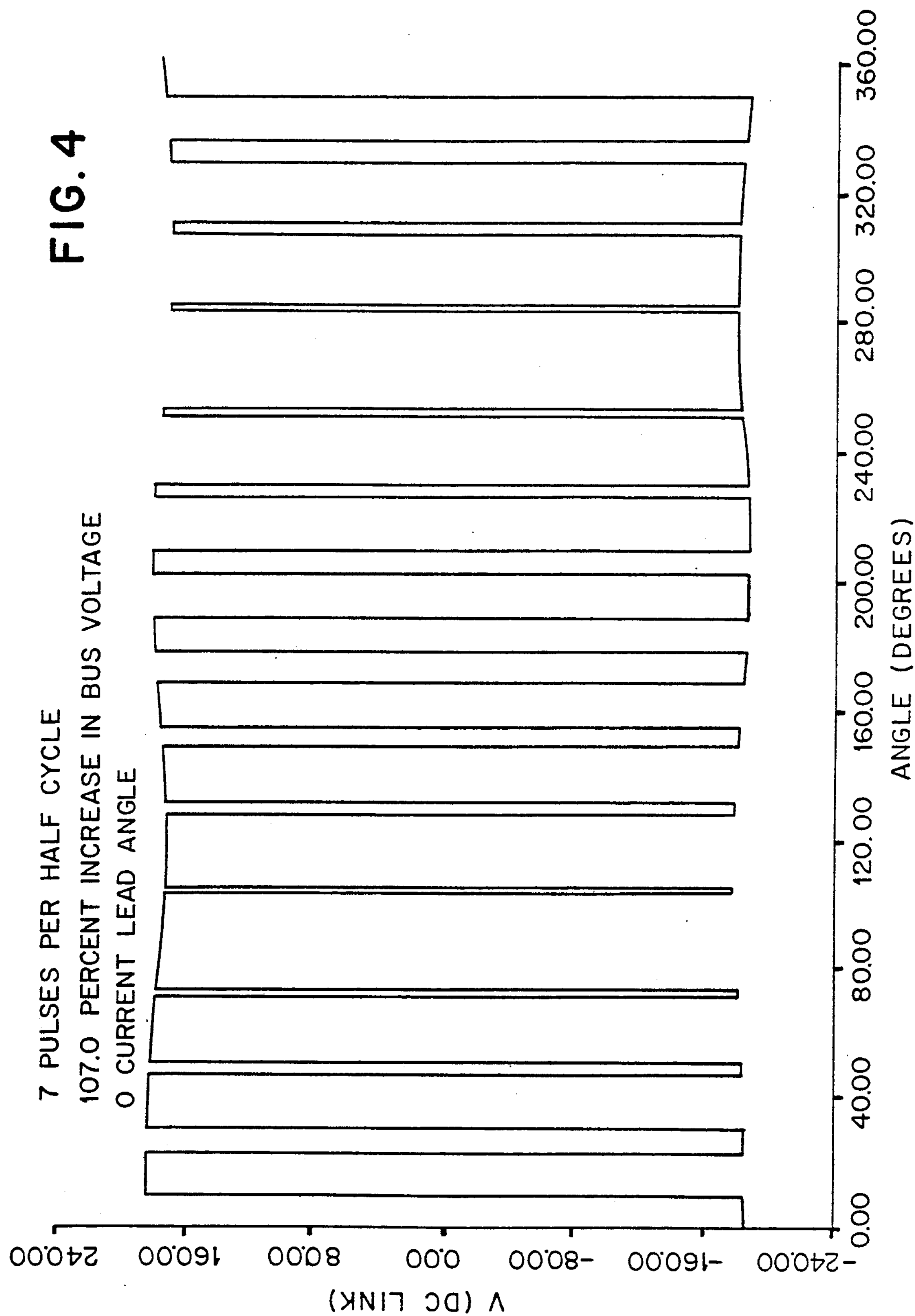
FIG. 4 represents an actual pulse pattern.

FIG. 3 represents an idealized example of an inverter output signal indicated generally as 61 and taken at point "C" in FIG. 1. The signal 61 comprises a plurality of positive and negative pulses of varying widths. The pulses produce an a.c. waveform when filtered That waveform is approximately sinusoidal as represented by dotted line 62 corresponding to signal 61. During operation, the VSCF system must supply power to loads having different real and reactive power requirements. Accordingly, the inverter controller 50 of FIG. 1 must store, or generate in real time, PWM patterns which are optimized to provide minimum harmonic distortion to the POR 80 for particular operating conditions; i.e., particular real or reactive power loads The different real and reactive power components of the loads are sensed at the POR 80 as shown in FIG. 1. In response to signals sensed at the POR 80, the inverter controller 50 provides an inverter control output signal which is used to control switches within the inverter 40.

The present invention is an extension of the system of the type disclosed in U.S. Pat. No. 4,527,226 to Glennon. In the Glennon system, an angle set is selected from a table of sets which best fits a given load condition. In many applications, however, the number of patterns can be prohibitively large requiring more memory than economically or practically feasible When this becomes the case, the angles may be computed for the full range of input parameters at selected intervals of those variables. For the operating range of a given application, a set of equations relating switch angle to a system variable or variables, is determined. Constants for these equations are stored in non-volatile memory in the controller 50 shown in FIG. 1. In response to a change in d.c. link voltages and/or a change in load requiring a new angle set for the inverter 40, the new angle set is calculated on the basis of the stored parameters.

Figure 5:
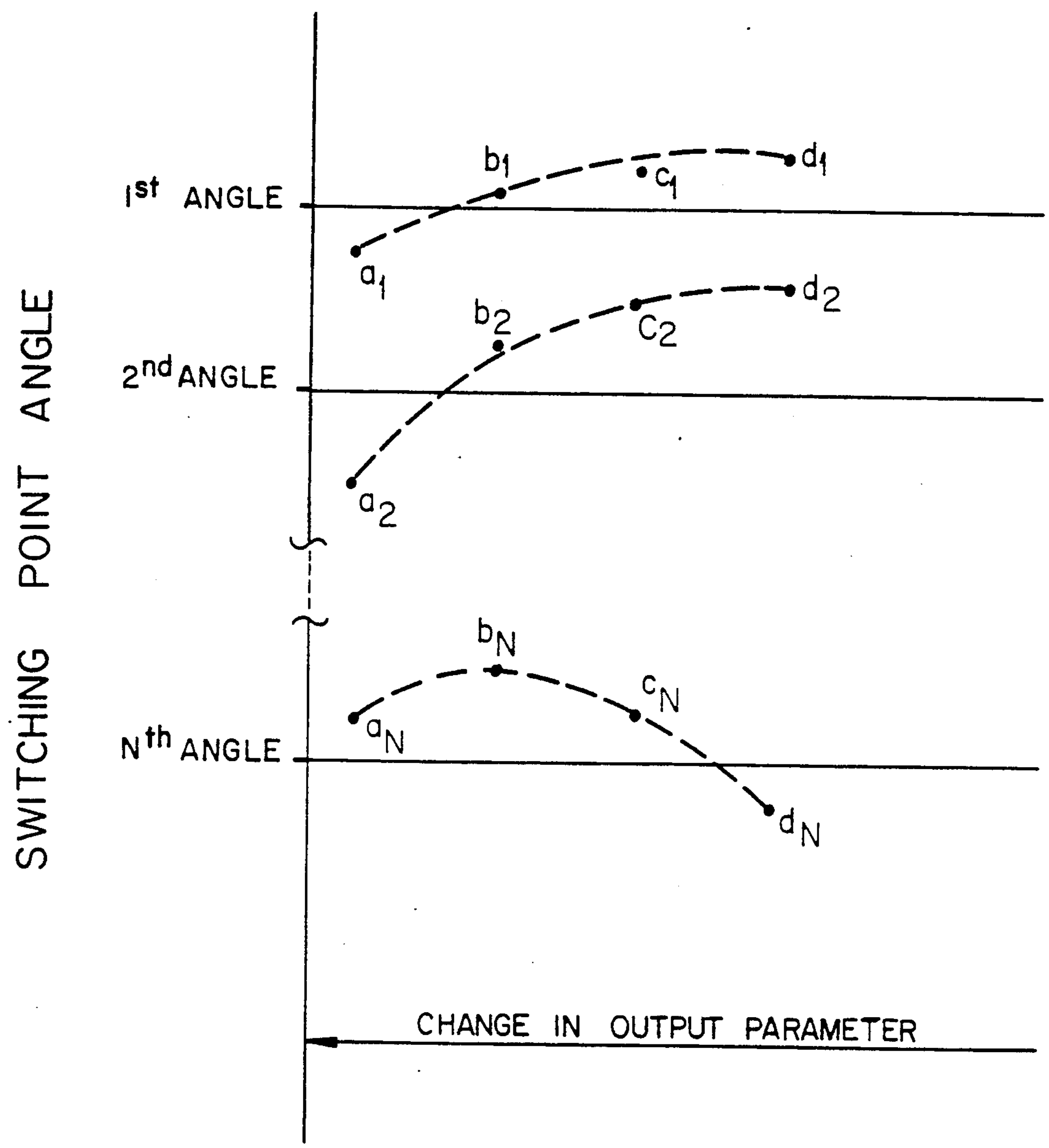
FIG. 5 illustrates an empirically or computer model derived plot of switching angle positions versus parameter change.

Referring now to FIG. 5, the equations for the switching point angle location may be determined empirically for the operation of a system or class of systems such as shown in FIG. 1 or from a computer model of the system. The example of FIG. 5 considers a single parameter (e.g., phase RMS voltage or power factor) for ease of explanation. It will be appreciated that equations may be developed in a similar manner for a plurality of parameters.

In this example, a parameter such as output phase RMS voltage or power factor is varied throughout its expected range. At points a through d the switching angles (1st through N) are adjusted and the harmonic content of the output examined until each switching angle is positioned so as to provide a minimum (or design level) of harmonic distortion in the inverter output for a particular value of parameter. Using well known techniques, an equation is determined which will fit or approximate a curve passing through the plotted points Experience shows that the equation for many systems will be a quadratic equation of the form:

$$K_1+K_2 \cdot a+K_3a^2=0$$

where a is the input parameter and $K_1$, $K_2$ and $K_3$ are constants which are different for each switching angle; the constant $K_1$ establishes a nominal position for the angle and hence its order in the sequence Of course, the equation, depending upon the shape of the curve passing through the points (e.g., a through d), may be of a higher order than two. Similarly, it will be appreciated that for most cases it will be satisfactory if the equation approximates the curve.

Figure 6:
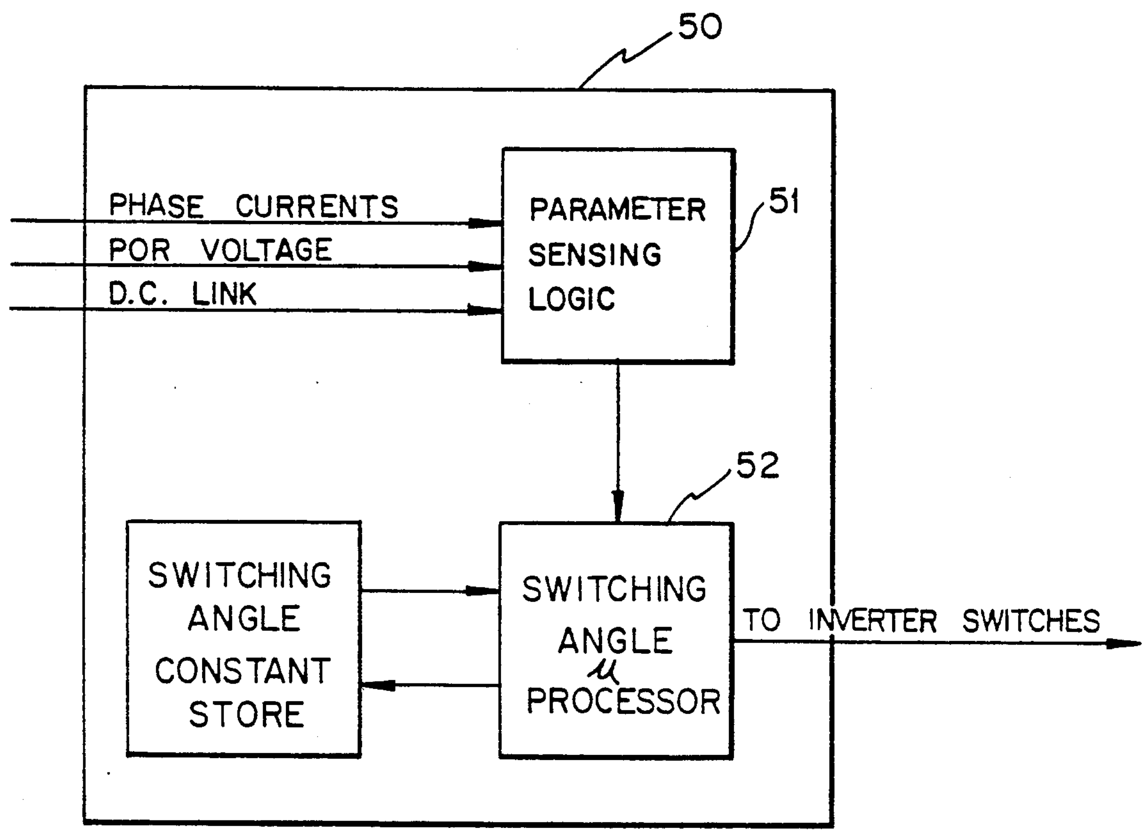
FIG. 6 is a block diagram of the inverter controller shown in FIG. 1.

Referring now to FIG. 6, there is illustrated in block diagram form the inverter control 50 shown in FIG. 1. The inverter control 50 develops operating signals for switches in inverter 40 to produce one of a plurality of PWM outputs in accordance with the sensed parameters. The inverter control 50 includes parameter sensing logic 51 which senses the various operating parameters of the inverter, including the currents developed in each of the phase outputs of the inverter, the phase voltages at the POR and the voltage across the d.c. links 31 and 33. The parameter sensing logic 51 generates outputs to a switching angle microprocessor 52 which generates the switching angle signals used to control the inverter switches $Q_1$ to $Q_6$.

The microprocessor 52 is programmed to solve the equations which determines each switching angle position; for example, an equation of the form $$K_1+K_2a+K_3a^2=0$$

where $K_1$, $K_2$ and $K_3$ are a unique set of constants for each switching angle. The parameter a may be the load RMS voltage or the power factor, for example. A switching angle constant store 53 stores a set of constants for each switching point.

Figure 7:
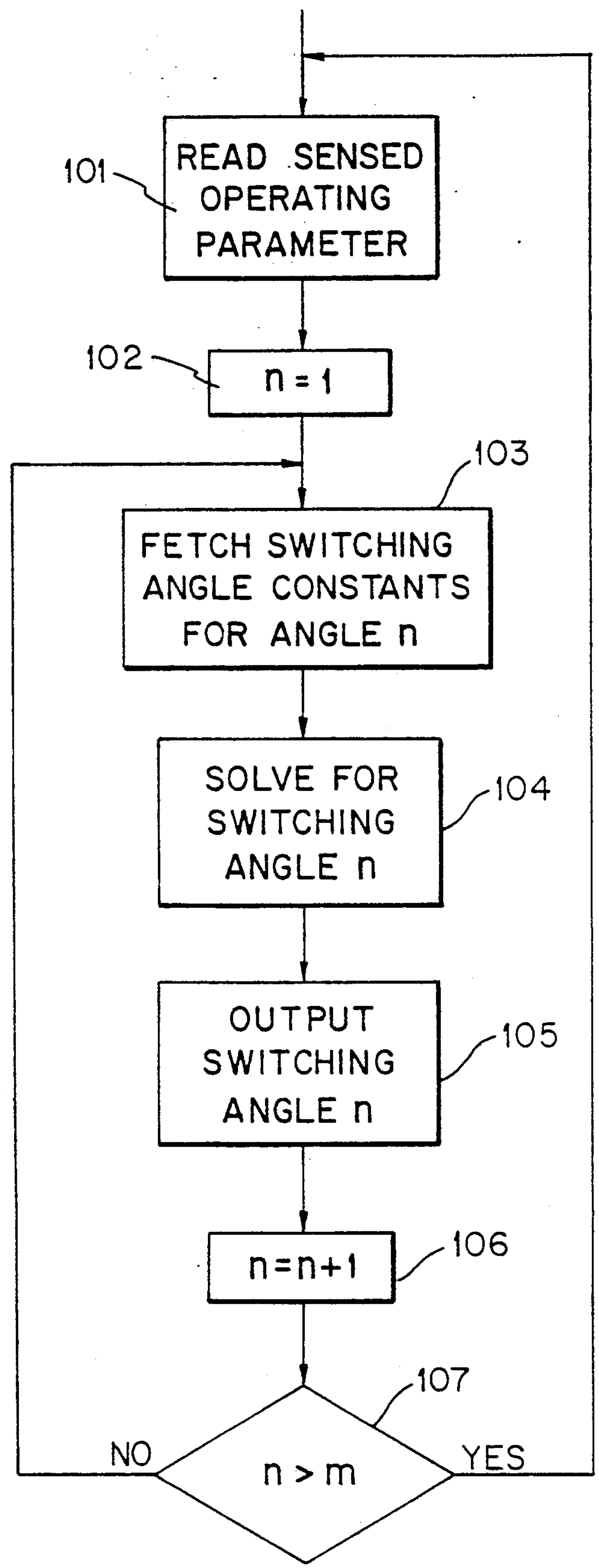
FIG. 7 is a flow diagram illustrating the operation of FIG. 6.

Referring now to FIG. 7, in operation in block 101 the microprocessor 52 reads operating parameter of interest (e.g. power factor) from the parameter sensing logic 51. The switching angle number n is set to 1 (block 102) and the microprocessor fetches a set of constants associated with first switching angle (block 103). The microprocessor solves an equation in block 104 to determine the position of the first angle on the basis of stored constants and the value of the input from parameter sensing logic 51. The processor outputs the calculated first switching angle in block 105 and in block 106*n* the switching angle is incremented by 1. As long as the switching angle number in block 107 is less than the total number of angles to be calculated (m), the process repeats for the switching angles in sequence When n=m the process repeats from the beginning.

The example for calculating switching angles has been based upon one system parameter. The technique may be used to respond to changes in a plurality of parameters. In addition, it will be appreciated that if desired the calculated angles values may be stored and used repeatedly. In this case, new values would be calculated when there is a change in the input parameter exceeding a threshold amount.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. In a pulse width modulated inverter, a system for generating a switching angle control signal in response to an inverter output parameter, comprising in combination;

means for storing a set of constants for a switching angle, said constants comprising constant terms of an equation which describes a locus of values of said switching angle for a desired inverter output characteristic as a function of said parameter;

means for fetching said stored set of constants and calculating said switching angle as a solution to said equation with said constants and said parameter comprising terms of said equation.

2. A pulse width modulated inverter as in claim 1 wherein said desired inverter output characteristic is reduced harmonic distortion.

3. In a pulse width modulated invertor, a system for generating a switching angle control signal in response to an invertor output parameter, comprising in combination;

means for storing a plurality of sets of constants for a plurality of said switching angles, each of said sets of constants comprising constant terms of an equation which describes a locus of values of one of said plurality of switching angles for a desired inverter output characteristic as a function of said parameter;

means for fetching said stored plurality of sets of constants and calculating a plurality of said switching angles as a solution to said equation with said constants and said parameter comprising terms of said equation.

4. A pulse width modulated inverter as in claim 3 wherein said desired inverter output characteristic is reduced harmonic distortion.

* * * * *